United States Patent

Karlsson

[15] 3,664,048

[45] May 23, 1972

[54] CARD FILE

[72] Inventor: Lauri E. Karlsson, 13 Solvagen Alta, Sweden

[22] Filed: Sept. 26, 1969

[21] Appl. No.: 861,331

[30] Foreign Application Priority Data

Dec. 13, 1968 Sweden....................................17080/68

[52] U.S. Cl.....................................................40/65, 40/336

[51] Int. Cl.....................................................G09f 11/30

[58] Field of Search..............................................40/65, 336

[56] References Cited

UNITED STATES PATENTS

| | | | |
|---|---|---|---|
| 2,990,639 | 7/1961 | Van Gieson | 40/336 |
| 3,167,371 | 1/1965 | Parcher et al. | 40/336 |

*Primary Examiner*—Robert W. Michell

*Attorney*—Linton & Linton

[57] ABSTRACT

A telephone number index having a casing with a stack of cards slidably supported in said casing for being slid in and out of said casing, a slot in the inner edge of said cards and a projection in an end of said casing of a size, shape and position for entering said card slots to frictionally engage said cards tending to retain the cards in said casing until one or more of said cards is slid outwardly of the casing by a user thereof.

4 Claims, 3 Drawing Figures

Patented May 23, 1972

3,664,048

2 Sheets-Sheet 1

INVENTOR
LAURI ENSIO KARLSSON

By Linton and Linton
ATTORNEYS

Patented May 23, 1972

3,664,048

2 Sheets-Sheet 2

INVENTOR
LAURI ENSIO KARLSSON

By Linton and Linton
ATTORNEYS

CARD FILE

This invention has for its purpose to provide a card file, preferably a so called telephone register of the type which includes a box-shaped casing adapted to receive a card pack, comprising a plurality of register cards stacked upon each other, in which the mechanism for pulling out a desired card is extremely simple and does not include any keys or similar elements for the selection. In addition thereto the new telephone register is very sturdy and reliable.

To obtain these objects the casing is provided with at least one projection, the height of which is at least as big as the thickness of the card pack and which is adapted to cooperate with corresponding portions of the card pack for loosably holding the card pack in its inactive position within the casing. The cards are provided with tabs which are adapted in a staggered relationship to each other such that when a tab is pressed against a preferably slidable support for example by means of a finger and the finger is then moved outwardly, cards, lying beneath said card will also be moved outwardly while cards lying above said card will remain stationary owing to the action of the projection of the casing. By designing the markings on the tabs as raised lettering the friction when pulling out the cards is increased which facilitates the operation in question.

DESCRIPTION

The drawings illustrate a preferred embodiment of the invention.

Figure 1:
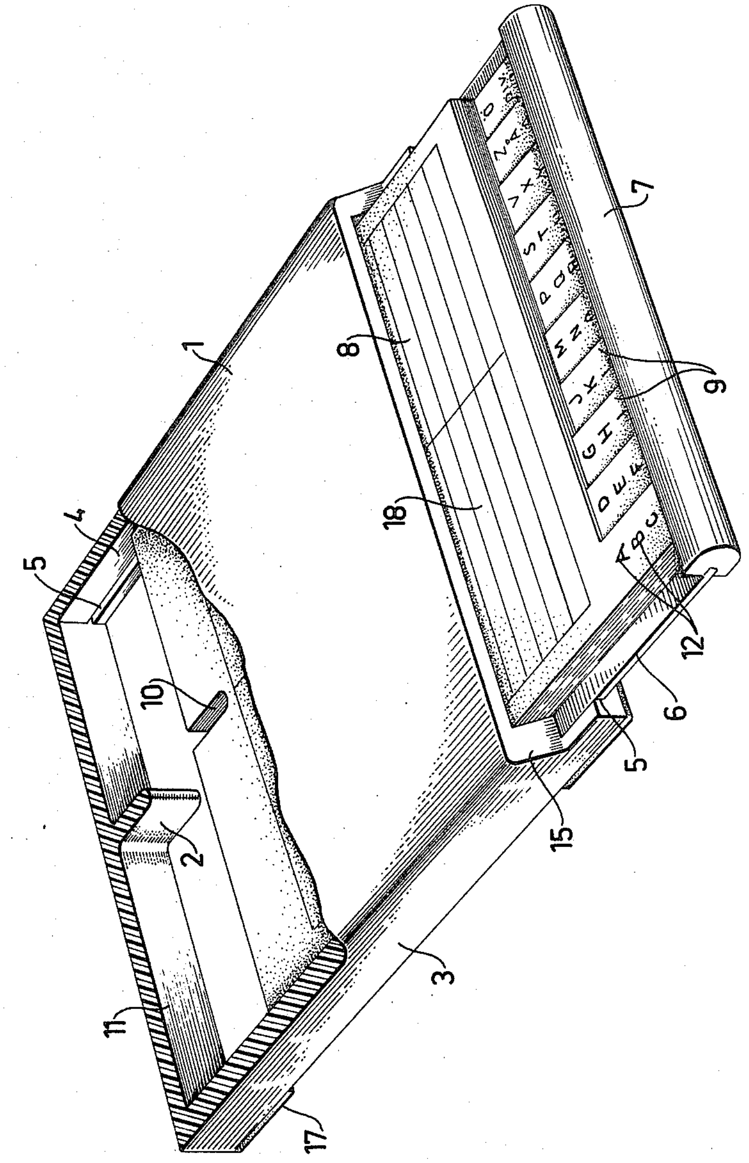
FIG. 1 is a perspective view of the new card file, partly broken away and with its parts somewhat spaced apart.

The card file according to the drawing includes a casing in the shape of a downwardly open rectangular box. The casing is in its rear portion provided with a projection, which according to FIG. 1 extends in the length direction of the casing and has the same height as the casing.

Figure 2:
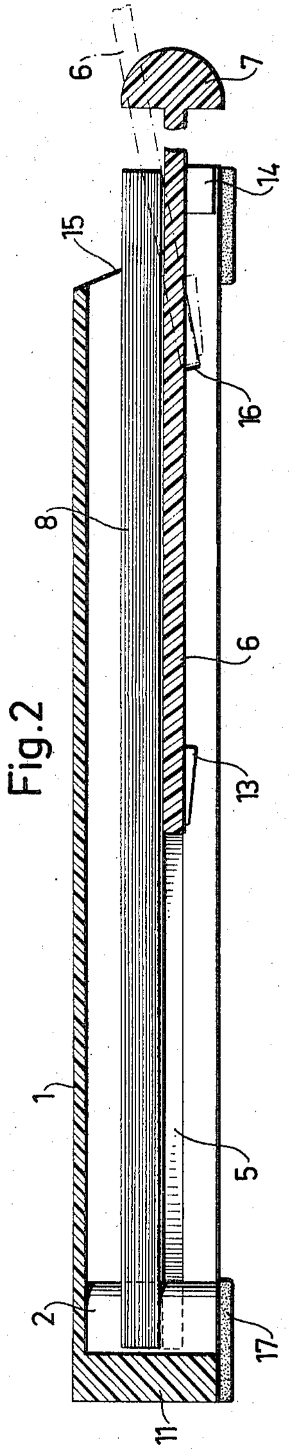
FIG. 2 is a longitudinal section through the card file.
Figure 3:
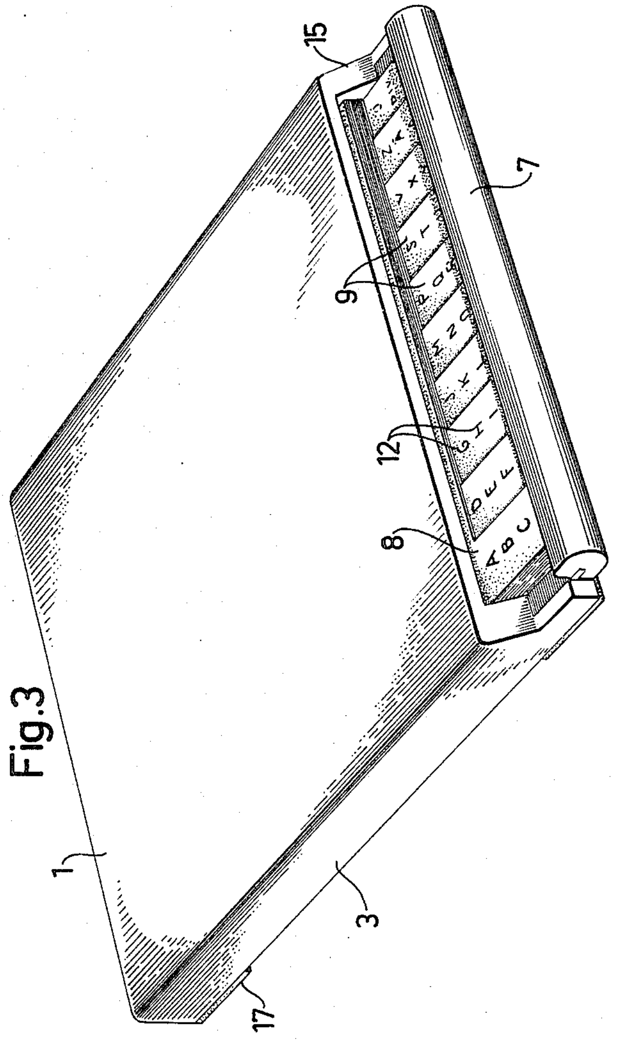
FIG. 3 shows the card file in an assembled condition.

In the side walls 3,4 of the casing 1 are provided grooves or channels 5 which constitute guides for a slidably arranged plate 6 serving as a base plate and which in its front portion has a rim 7, which has a height over plate 6 that exceeds the total thickness of the cards 8, used in the card file. Said cards 8 are in their front portion provided with tabs 9 which are adapted in a stepped or staggered relationship to each other according to the drawing. They are preferably integral with the cards and are obtained by means of punching. Each card has in its rear portion a cut out portion 10, which as shown in FIG. 1 is located at the same place in all the cards such that the card pack when properly adapted in the casing will have a slotted portion. The cut out portions are calibrated such that they frictionally engage the projection 2 of the casing. Thus when the cards are in their fully retracted position as shown in FIG. 2 they are frictionally held by the projection 2 protruding from the rear wall 11 of the casing. The slidable plate is either shorter than the casing or provided with a slot which makes it possible for the same to be fully inserted in the casing unobstructed by the projection 2, as shown in FIG. 2.

When it is desired to pull out a card for observing denotations on the same or making denotations it is only necessary to press a finger against the tab bearing the desired lettering and then draw the plate 6 outwardly while maintaining the pressure upon the tab. Cards located under the chosen card will take part in this outward movement while cards located above the chosen card will be held by the projection 2 in cooperation with the slots 10. The tabs are provided with letterings 12 and in order to increase the friction between the finger and the tab in question the lettering is preferably raised.

By means of the rim 7 plate 6 may be pushed invardly and the rim acts then upon the cards to move them into their initial position. For limiting the displacement of the plate 6 there are at the under side of said plate adapted stop projections 13, which are intended to cooperate with corresponding stop members 14 of the casing. In order to make it possible to insert the plate in the casing or remove it from the casing there are in the front portion of the latter provided upper and lower cut outs 15, 16 opening into the guide channel 5. Owing to these cut outs the plate may take an oblique position, shown with dotted lines in FIG. 2.

The card file is also provided with supports 17 so that the card file may be placed upon a surface without causing any damage to the same at the same time as the supports prevent unintended movement of the card file.

I claim:

1. A telephone number index comprising a box-shaped casing, a card pack consisting of register cards stacked upon each other in said casing and having a rear end portion with at least one slot extending the thickness of said pack, a bottom plate being slidably arranged relative to said casing, said bottom plate having a front rim the height of which exceeds the thickness of said card pack intended to rest upon said bottom plate, at least one projection connected to said casing and having a height at least equal to the thickness of said card pack and a width somewhat exceeding the narrowest width of said slot in the rear portion of said pack, said projection being located such that it will be received in said slot when the cards in question are in their retracted position in said casing and such that each card is removably held by friction between on the one hand the edge portions surrounding said slot and on the other hand the projection, and means for selectively pulling out said cards consisting of tabs connected to the opposite end portion of said cards and sideways displaced relative to each other whereby selection of a card can be made by merely pressing a finger against a selected tab and moving the finger outwardly while maintaining the pressure upon said tab.

2. A telephone number index as claimed in claim 1 in which said casing has sides in which grooves extend longitudinally and said slidable bottom plate is guided in said grooves.

3. A telephone number index as claimed in claim 2 in which said slidable bottom plate has projections, stop means are connected to said casing at a position thereon for being engaged by said projections to limit the outwards displacement of said bottom plate relative to said casing and said guiding grooves are shaped such that they permit said bottom plate to be tilted into a position in which it may be removed from said casing unobstructed by said stop means when said bottom plate is in its outwardly displaced position.

4. A telephone number index as claimed in claim 1 in which said card tabs are provided with friction increasing portions.

* * * * *